United States Patent Office 3,460,643
Patented Aug. 12, 1969

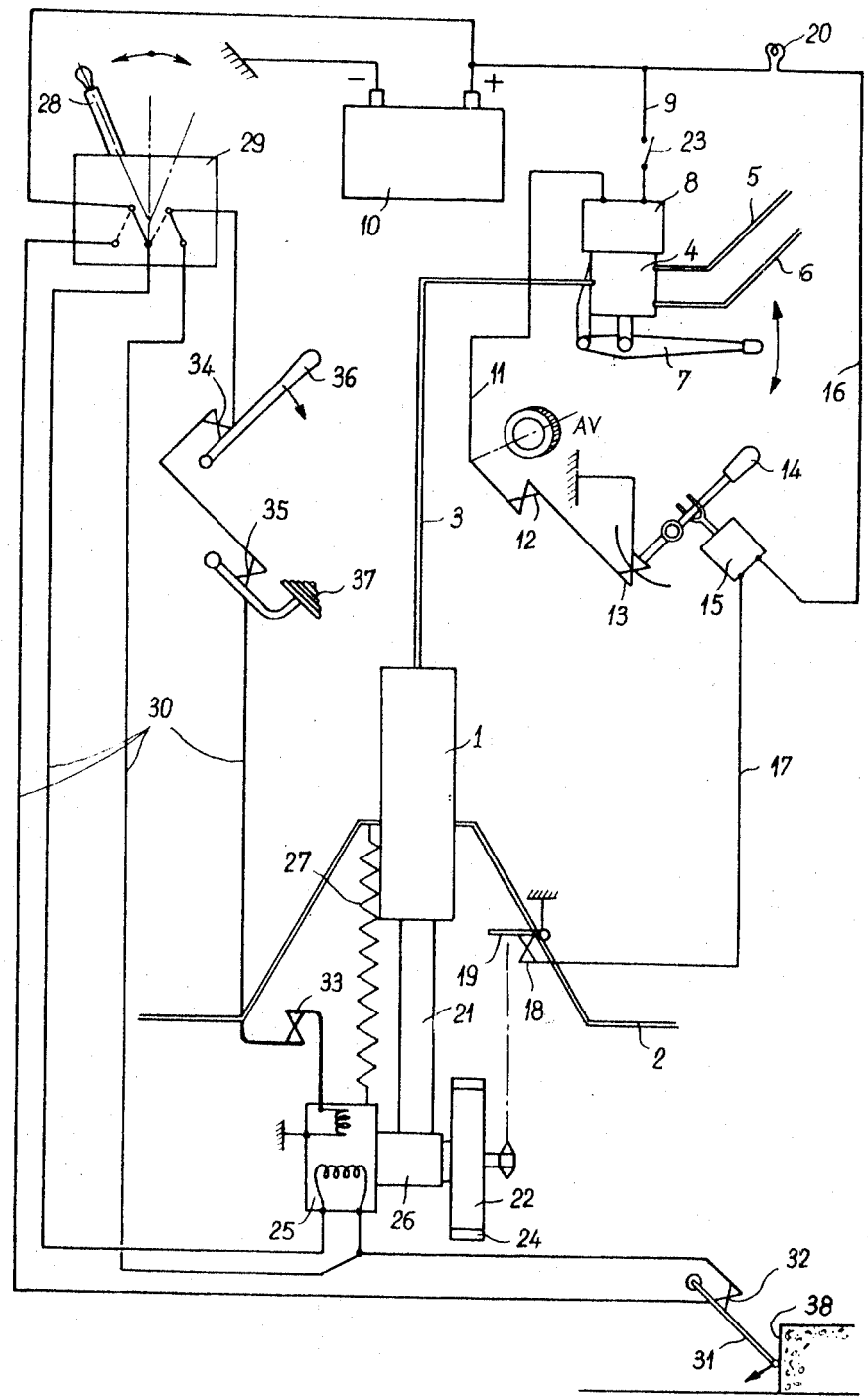

3,460,643
WHEEL DEVICE FOR LATERALLY MOVING AN AUTOMOTIVE VEHICLE FROM REST
Edmond Henry-Biabaud, Paris, France, assignor to Societe Anonyme Andre Citroen, Paris, France
Filed Nov. 16, 1967, Ser. No. 683,670
Claims priority, application France, Dec. 16, 1966, 87,725
Int. Cl. B60s 9/20
U.S. Cl. 180—1    8 Claims

ABSTRACT OF THE DISCLOSURE

A lifting device equipped with a single wheel at its lower end is mounted on the rear portion of the vehicle and control means are adapted to lower this device when the vehicle is at a complete standstill so that said wheel engages the ground and the rear wheels of the vehicle are raised off the ground, a motor operatively connected to said single wheel through a non-reversing reduction gearing is adapted to move the rear portion of the vehicle laterally in either direction, auxiliary locking and safety means being provided for avoiding any untimely manoeuver.

---

This invention relates to a wheel device for moving an automotive vehicle laterally from rest.

The difficulties to be overcome by drivers for parking an automotive vehicle in a narrow space between two successive vehicles are well known. In most cases the driver must give up the idea of parking his vehicle, in spite of a sufficient space available therefor, due to the physical impossibility of performing the conventional parking manoeuver in reverse gear.

It is the essential object of the present invention to provide a simple and economical device whereby an automotive vehicle can be parked without difficulty by displacing the vehicle laterally after having partially engaged the vehicle into the parking space, the manoeuvers being performed without any risk of interfering with, or running into, the already parked vehicles.

The device according to this invention, which comprises a lifting device rigid with the rear portion of the vehicle frame and a suitable control member permitting of vertically lowering or raising the movable member of the lifting device, is characterised essentially in that the movable member of the lifting device carries at its lower end a single wheel drivingly connected directly through a non-reversible reduction gearing to a reversible motor adapted to cause said wheel to rotate laterally on the ground in the offside and nearside directions, at will, and that auxiliary locking and safety means are provided whereby the lifting and the lateral displacement of the rear portion of the vehicle cannot take place unless the vehicle is at a complete standstill, so as to avoid any untimely manoeuver.

The features and advantages of this invention will appear more clearly as the following description proceeds with reference to the accompanying drawing of which the single figure illustrates diagrammatically by way of example a typical form of embodiment of the wheel device constituting the subject-matter of the invention, as applied to an automotive vehicle already equipped with a hydraulic distribution system.

This figure shows a hydraulic ram 1 rigidly mounted on the rear portion of the vehicle frame and disposed preferably in the bottom of the trunk or boot 2 of the vehicle, and on the longitudinal center line thereof. Assuming that this vehicle is equipped with a hydropneumatic suspension system, a hydraulic pressure distribution circuit is provided thereon. The cross-sectional or working area of the ram is such that the hydraulic pressure available on the vehicle is sufficient for lifting the rear portion of the vehicle, even if the latter is overloaded. A pipe line 3 connects the cylinder of the hydraulic ram to a distributor 4 controlling the lifting and lowering of the vehicle end; this distributor is of the type used in systems for correcting the vertical position of a vehicle and therefore the ground clearance of a vehicle equipped with a hydropneumatic suspension system. An inlet pipe line 5 connects the distributor 4 to the hydraulic feed circuit of the vehicle, another line 6 constituting the exhaust leading from this distributor to the hydraulic fluid reservoir (not shown). On the other hand, a control lever 7 adapted to be lowered and raised is disposed within easy reach of the driver to control the lifting and lowering movements of the ram 1 by either supplying hydraulic fluid under pressure to said distributor or exhausting this fluid therefrom, any delivery of pressure fluid being prevented in the intermediate position of this control lever.

An electrical locking device 8 associated with the distributor 4 is connected through a conductor 9 to the positive terminal of the storage battery 10 of the vehicle and through another conductor 11 to the ground, via a pair of contacts 12 and 13. Contact 12 is responsive to a device responsive in turn to the rotation of the front wheels of the vehicle in either direction to close the electrical circuit when these wheels are stationary. The other contact 13 responsive to the gear lever 14 is adapted to close the circuit when the gear lever is in its neutral position. The control lever 7 is locked when device 8 is not energized, i.e. when any of the contacts 12 and 13 is open.

Under these conditions, the device 8 is released and then the ram can be lowered only if both the front wheels of the vehicle are stationary and the gear lever is in its neutral position as shown in the drawing. Thus, any untimely ram operation is safely avoided, notably in case children were led to tamper with the device during a drive.

This device is completed by a safety electrical lock 15 associated with the gear lever 14 and connected through a conductor 16 to the positive terminal of the battery 10, and through another conductor 17 to a fixed contact 18 disposed in the bottom of the boot 2. This fixed contact 18 is engageable by a movable contact 19 affixed to the boot 2 for grounding the circuit controlling the lock 15 when the movable member of the ram emerges from its collapsed or inoperative position in the boot. A telltale lamp 20 may advantageously be inserted in this circuit. As long as the rod 21 of ram 1, which carries the wheel 22 (to be described presently) actuating the contact 19 to open the circuit of the lock 15 as indicated schematically on the drawing by a dotted line, has not resumed its fully retracted or inoperative position the lock 15 will prevent the operation of gear lever 14 from neutral and the tell-tale lamp 20 remains lighted; thus, any untimely movement of the vehicle is avoided when the wheel 22 is lowered.

The conductor 9 is connected to the positive terminal of the storage battery through the engine ignition switch 23. Thus, the locking device 8 of distributor 4 is deenergized during the periods in which the vehicle is not operated.

The movable rod 21 of ram 1 carries at its lower end a wheel 22 adapted to rotate in a plane perpendicular to the longitudinal center line of the vehicle. This rod is movable in a direction substantially perpendicular to the ground. The wheel 22 has a solid tire 24 and its outer diameter, of the order of 8″, is sufficient for rolling on paving stones if necessary. A D.C. motor 25, preferably of the series-wound type, is adapted to drive the wheel 22 in either direction through the medium of a non-reversible reduction gearing 26 to avoid the use of a special brake.

The permissible stroke of ram 1 is sufficient for lifting the rear portion of the vehicle so that both rear wheels clear the ground by about two inches. A limit stop, not shown is incorporated in the ram.

A tension spring 27 having one end secured to the frame of the vehicle and the other end secured to the motor-gearing-wheel unit is adapted to return this unit into the boot of the vehicle when the latter is to be driven normally.

A lever 28 mounted on the instrument panel of the vehicle and operable laterally controls a reversing switch 29 connected to the electric motor 25 of wheel 22 for causing this motor to rotate in one or the other direction at will and thus move the vehicle laterally in the offside or nearside direction. In the intermediate position of this control lever 28 the motor 25 is deenergized.

An electrical circuit 30 interconnects the switch 29, the motor 25 and a contact 32 actuated by a curbstone feeler 31 mounted on the offside of the vehicle; this electrical circuit also includes a limit switch 33 of the ram 1 and a pair of contacts 34 and 35 responsive to the hand or parking brake 36 and to the brake pedal 37, respectively. These last-named contacts 34, 35 are adapted, by opening the energizing circuit of motor 25, to prevent the latter from operating in case the brakes of the vehicle were applied. The same applies in case the ram were not fully operated and if the ground clearance of the rear wheels were not sufficient, for contact 33 would then remain open.

The device described hereinabove operates as follows:

After having engaged the front portion of his vehicle into the space contemplated for parking purposes, the driver applies the parking brake and raises the vehicle by operating conventional level corrector not shown; thus, any swinging movements during the lateral displacements of the vehicle will be safely avoided. Having set the gear control lever 14 to neutral, the driver lowers the ram 1 by depressing the distributor lever 7. When the wheel 22 actually engages the underlying ground and the rear wheels are lifted off the ground, that is, when contact 33 is closed, the driver releases the parking brake 36 and actuates the motor 25 by moving the control lever 28 of switch 29 in the desired lateral direction. When the vehicle moves to the right, the feeler 31 engages the curbstone 38, thus opening contact 32 and therefore de-energizing the motor 25; the vehicle will thus be brought to a complete standstill about 8″ from the curbstone. It will be noted that the contact 32 operates outside the circuit controlling the rotation of motor 25 in the reverse direction. When the vehicle is moved laterally to the nearside, the driver stops the motor 25 by restoring the control lever 28 to its central or intermediate position or applying the parking brake 36.

The attached drawing shows diagrammatically a mounting for a vehicle normally driven in countries where right-hand driving is required, but of course when the system is to be mounted on a vehicle normally driven in countries where left-hand driving is compulsory, the the driver's seat being then on the right-hand side, the feeler 31 will be disposed on the nearside of the vehicle.

To remove the vehicle from its parking position the driver firstly releases the parking brake, then starts the motor 25 in the proper direction; after a sufficient lateral displacement of the vehicle the motor 25 is stopped and the distributor lever 7 is raised, thus lifting the ram 1 and lowering the rear portion of the vehicle. When the ram 1 is fully collapsed or retracted in the boot 2, contact 19–18 opens and the electric lock 15 will free the gear lever 14. Then the driver actuates the level corrector to restore the desired ground clearance, and the vehicle can start normally away.

The electric motor 25 may be replaced by a hydraulic or pneumatic motor, if desired, which is supplied through a distributor valve operated by suitable electrical or hydraulic means.

Similarly, the hydraulic ram may be replaced by any other similar lifting device of the hydraulic, pneumatic or electric control type.

I claim:

1. A car parking wheel device for laterally displacing a stationary automotive vehicle having a recessed rear boot portion, an ignition switch in an ignition circuit, a gear lever, a parking brake lever and a main foot brake pedal, said device comprising in combination:
    (a) a telescopic lifting device rigidly disposed upright within the rear boot portion, and having a movable member adapted to be extended and retracted therefrom;
    (b) a single parking wheel carried by the lower end of said movable member;
    (c) a reversible motor operatively coupled with said parking wheel and adapted to cause said wheel to roll laterally when on the ground in two directions;
    (d) control means including a fluid distributor and a related control member operable for lowering and raising said movable lifting member by means of said fluid distributor to respectively lift and lower the rear part of the vehicle by extending and retracting said movable member;
    (e) said parking device further comprising circuit means including safety locking means in conjunction with each of the said control means, said gear lever and said parking wheel motor to control the same to thereby prevent said parking wheel from being untimely lowered and rotated, to cause an inopportune lateral movement of said vehicle; and
    (f) whereby the circuit is such that when the vehicle's front wheels are stationary and the gear lever is in a neutral condition, the lifting means is operable to raise the vehicle, with said parking wheel and operating reversible motor being safetly inoperable while the vehicles parking brake lever and main foot brake pedal are set; and under other conditions said parking wheel and operating reversible motor are operable only after the movable member of the lifting device has been fully and completely extended thereby initiating additional safety means including keeping said gear lever locked in neutral, and with said brake pedal or parking brake lever being moved to the released position.

2. A parking device as defined in claim 1 wherein the safety locking means includes:
    (a) locking members cooperable with said control member and said gear lever;
    (b) an electrical locking device associated with said fluid distributor and with said control member;
    (c) said electrical locking device operable to preclude operation of said lifting device by means of said locking members, and
    (d) said electrical locking device when energized releases said control members to permit its actuation to effect operation of the lifting device.

3. A parking device as defined in claim 2 wherein said electrical locking device includes circuit means controlled by said ignition switch.

4. A parking device as defined in claim 1 wherein the locking device includes an electrical circuit having electrical contacts associated with the front wheels of said vehicle, and having contacts associated with said gear lever, said circuit being closed by the vehicle front wheels only when in a predetermined stopped condition and by the closed gear lever contacts including a grounding contact only when the vehicle gear lever is in its neutral position.

5. A parking device as defined in claim 1 wherein said circuit means includes an electrical circuit and electrical locking device including means to lock said vehicle gear lever in its neutral position when said electrical locking device is energized.

6. A parking device as defined in claim 5 wherein the electrical locking device includes an energizing circuit with grounding means and with contact means including a fixed contact on said vehicle adjacent the lifting device, and a movable contact operably connected to said lowerable and raiseable parking wheel; said circuit energized to permit rotation of said parking wheel only by said movable contact contacting said fixed contact when the movable member of the lifting device is in its fully lowered or extended position; and said circuit is open when said movable contact is at the end of the fully upward movement of said parking wheel when lifted by said lifting device.

7. A parking device as claimed in claim 1, wherein said circuit means includes an electrical circuit having a plurality of contacts connected in series with said parking brake and main brake pedal and the parking wheel motor; and said parking wheel motor is energizable only when either of the vehicle brakes are applied.

8. A parking device as defined in claim 7 wherein said parking wheel motor energizing circuit includes contact means including a curbstone feeler arm supported by one side of said vehicle and adapted to be opened by engagement with a curbstone during a parking operation.

References Cited

UNITED STATES PATENTS

| | | |
|---|---|---|
| 1,914,643 | 6/1933 | McCann. |
| 2,058,530 | 10/1936 | Thomas. |
| 2,638,995 | 5/1953 | Gottlieb. |
| 2,764,249 | 9/1956 | Paolucci. |
| 2,983,327 | 5/1961 | Hult. |

A. HARRY LEVY, Primary Examiner

U.S. Cl. X.R.

180—103; 340—61